(12) United States Patent
Izumi et al.

(10) Patent No.: US 9,732,411 B2
(45) Date of Patent: Aug. 15, 2017

(54) METHOD FOR MANUFACTURING GAS TURBINE BLADE, AND GAS TURBINE BLADE

(71) Applicant: Mitsubishi Hitachi Power Systems, Ltd., Yokohama-shi, Kanagawa (JP)

(72) Inventors: Takeshi Izumi, Yokohama (JP); Hideyuki Arikawa, Yokohama (JP); Yoshitaka Kojima, Yokohama (JP); Akira Mebata, Tokyo (JP); Tadashi Kasuya, Yokohama (JP); Shinya Imano, Yokohama (JP); Koji Miyamoto, Yokohama (JP)

(73) Assignee: Mitsubishi Hitachi Power Systems, Ltd., Yokohama-shi (JP)

( * ) Notice: Subject to any disclaimer, the term of this patent is extended or adjusted under 35 U.S.C. 154(b) by 465 days.

(21) Appl. No.: 14/289,432

(22) Filed: May 28, 2014

(65) Prior Publication Data

US 2014/0356186 A1 Dec. 4, 2014

(30) Foreign Application Priority Data

May 29, 2013 (JP) ................................ 2013-112755

(51) Int. Cl.
*B23P 15/02* (2006.01)
*C23C 10/04* (2006.01)
(Continued)

(52) U.S. Cl.
CPC ............ *C23C 10/04* (2013.01); *B22D 21/025* (2013.01); *B23P 15/02* (2013.01); *C23C 10/48* (2013.01);
(Continued)

(58) Field of Classification Search
CPC ........ F01D 5/288; F01D 25/005; F01D 5/286; F01D 2230/30; F01D 2230/90;
(Continued)

(56) References Cited

U.S. PATENT DOCUMENTS 6,146,696 A 11/2000 Das et al.
2003/0007870 A1 1/2003 Heyward et al.
(Continued)

FOREIGN PATENT DOCUMENTS

EP 1 365 108 A2 11/2003
EP 1 437 425 A1 7/2004
(Continued)

OTHER PUBLICATIONS

Extended European Search Report dated Feb. 9, 2015 (seven (7) pages).
(Continued)

*Primary Examiner* — Atif Chaudry
(74) *Attorney, Agent, or Firm* — Crowell & Moring LLP (57) ABSTRACT

This method is a method for manufacturing a gas turbine blade, including:
 producing a gas turbine blade having a cooling pass inside thereof; and
 partially coating an inner surface of the cooling pass with Al.
The step of partially coating an inner surface of the cooling pass with Al further including:
 a first step of specifying a temperature range which satisfies both of oxidation resistance and fatigue strength and the temperature distribution of the inner surface of the cooling pass based on an examination result or result of a numerical analysis;
 a second step of setting an Al-coating-applying portion of the inner surface of the cooling pass as the temperature range specified at the first step; and
(Continued)

a third step of applying Al coating only into the set Al-coating-applying portion.

4 Claims, 5 Drawing Sheets

(51) Int. Cl.
- *B22D 21/02* (2006.01)
- *F01D 5/28* (2006.01)
- *C23C 10/48* (2006.01)
- *F01D 5/18* (2006.01)
- *C23C 10/60* (2006.01)

(52) U.S. Cl.
CPC ............. *C23C 10/60* (2013.01); *F01D 5/18* (2013.01); *F01D 5/187* (2013.01); *F01D 5/288* (2013.01); *F05D 2230/211* (2013.01); *Y10T 29/49337* (2015.01); *Y10T 29/49341* (2015.01)

(58) Field of Classification Search
CPC ...... F01D 5/18; F01D 5/187; F01D 2230/211; C23C 10/04; C23C 10/60; C23C 10/48; Y10T 29/49341; Y10T 29/49339; Y10T 29/49336; B23P 15/02; B23P 15/04; B23P 21/025

See application file for complete search history.

(56) References Cited

U.S. PATENT DOCUMENTS

| | | |
|---|---|---|
| 2005/0058547 A1 | 3/2005 | Bruce et al. |
| 2006/0105160 A1* | 5/2006 | Berndt ................ C23C 8/04 428/323 |
| 2006/0193981 A1* | 8/2006 | Wheat ................ C23C 10/04 427/248.1 |
| 2007/0122647 A1 | 5/2007 | Russo et al. |
| 2007/0128027 A1 | 6/2007 | Langley et al. |
| 2009/0162209 A1 | 6/2009 | Wortman et al. |

FOREIGN PATENT DOCUMENTS

| | | |
|---|---|---|
| EP | 1 672 089 A1 | 6/2006 |
| EP | 2 072 759 A2 | 6/2009 |
| JP | 7-316843 A | 12/1995 |
| JP | 9-195049 A | 7/1997 |
| JP | 2001-32061 A | 2/2001 |
| JP | 2001-166819 A | 6/2001 |
| JP | 2001-330542 A | 11/2001 |
| JP | 2003-106166 A | 4/2003 |
| JP | 2003-120206 A | 4/2003 |
| JP | 2006-169631 A | 6/2006 |
| JP | 2007-146295 A | 6/2007 |
| JP | 2009-150387 A | 7/2009 |

OTHER PUBLICATIONS

Japanese Office Action issued in counterpart Japanese Application No. 2013-112755 dated Apr. 4, 2017 with English translation (four pages).

* cited by examiner

METHOD FOR MANUFACTURING GAS TURBINE BLADE, AND GAS TURBINE BLADE

CLAIM OF PRIORITY

The present application claims priority from Japanese Patent application serial No. 2013-112755, filed on May 29, 2013, the content of which is hereby incorporated by reference into this application.

BACKGROUND OF THE INVENTION

1. Field of the Invention

The present invention relates to a method for manufacturing a gas turbine blade having at the inside thereof a cooling pass, in which Al coating is applied onto the partial area of an inner surface of the cooling pass; and a gas turbine blade in which Al coating is applied onto a partial area of the inner surface of a cooling pass by this method.

2. Description of the Related Art

In recent gas turbines, a tendency of heightening the temperature of combustion gas therein has been advancing to aim for a rise in the efficiency of the turbines. The combustion gas temperature has already exceeded the melting point of a heat resistant alloy used in their turbine blade, turbine nozzle, and other components. Thus, a control is made in such a manner that a cooling pass is located inside the gas turbine blade or gas turbine nozzle and air is circulated in the pass to cool the blade or nozzle, thereby keeping the blade or nozzle at the allowable temperature of the heat resistant alloy, or lower.

However, even when gas turbines are cooled, a rise in the temperature of the inner surface of their cooling pass is unavoidable with the advance of the tendency of heightening the temperature of the gas turbines. Thus, in the present circumstances, the gas turbine temperature is close to the allowable temperature of the heat resistant alloy. In particular, the inner surface of the cooling pass, which is exposed to high temperature, is deteriorated by oxidation, so that the following two problems are caused:

The first problem of the two is the wastage of the pass by the oxidation. Specifically, bulges and depressions are made in one selected from various patterns on the inner surface of the cooling pass, and a convection caused by the bulges and depressions enhances the cooling effect. However, the inner surface of the cooling pass is oxidized so that the surface of the bulges and depressions undergo wastage. When the wastage causes a change in the shape of the inner surface, the gas turbine blade is directly lowered in cooling efficiency.

The second problem is the blockage of the cooling pass by oxides peeled from the inner surface. Specifically, the cooling pass is generally narrow and meandering to be complicatedly configured, so that oxides peeled therefrom deposit easily onto a cooling-air flow-rate change zone of the cooling pass. The depositing oxides block the pass to hinder the cooling.

Against the problems caused by the oxidization, a countermeasure is generally used in which for the formation of a protective oxide made of $Al_2O$ onto the inner surface of the cooling pass, the inner surface of the cooling pass is coated with Al or an alloy thereof, thereby improving this surface in oxidation resistance.

As described above, the cooling pass is complicatedly configured inside the blade, and is further narrow; thus, it is difficult to apply, to the pass, thermal spraying, electron beam physical vapor deposition (EB-PVD), overlay coating based on electroplating, or any other method that is generally used to give oxidation resistance to the outer surface of a blade.

Thus, it is general to use, as a method for applying Al coating onto the inner surface of the cooling pass, chemical vapor deposition (CVD) of supplying Al in the form of gaseous halogen to precipitate Al onto the inner surface of the cooling pass.

A main purpose of the Al coating is to improve the inner oxidation resistance of the inner surface of the cooling pass by the protective oxide made of $Al_2O_3$. However, it depends on cooling-temperature conditions whether $Al_2O_3$ is produced as an external oxide scale that fulfils a function as a protective layer that attains thermodynamic stability which $Al_2O_3$ has, or $Al_2O_3$ is produced as an internal oxide inside the coating layer not to fulfil a function as a protective layer.

$Al_2O_3$ is generally thermodynamically stable at about 900° C., and is further produced as an external oxide scale that fulfils a function as a protective layer. However, at temperatures of about 700° C., $Al_2O_3$ is thermodynamically unstable. In other words, $Al_2O_3$ itself is not easily produced, and even when $Al_2O_3$ is produced, produced $Al_2O_3$ remains as an internal oxide inside the coating layer not to fulfill a function as a protective layer.

When $Al_2O_3$ is produced as the internal oxide, the oxidation of Ni, Cr, and any other alloying-element that is contained in the substrate of the blade unfavorably advances, so that advantageous effects based on the Al coating are not produced. On the contrary, the oxidization may be accelerated.

In a gas turbine blade, centrifugal force, thermal stress based in a difference in temperature between combustion gas and cooling air, and other stresses are generated. These stresses are complicatedly changed by starting or stopping the action of the gas turbine. Thus, the fatigue strength of the blade is very important. In connection with the fatigue strength, a high-Al-concentration alloy layer formed by Al coating, such as NiAl, is poor in toughness and ductility to decline the blade in strength reliability, in particular, fatigue strength.

The degree of this decline in the fatigue strength depends on the material of the blade. However, the degree is remarkably increased at low temperatures of about 600° C. or lower.

Apart from the above, the temperature distribution of the inner surface of the cooling pass of the gas turbine blade is uneven and depends on the design of the blade. However, almost all of temperatures of the blade are designed to be about 700° C. Edges of the blade, or the leading edge and the trailing edge of the blade, and other high-temperature regions thereof are designed to be adjusted to about 900° C.

Accordingly, when Al coating is applied onto a low-temperature portion of the inside of the cooling pass, the region is improved in oxidation resistance. However, the degree of the improvement is small. About the fatigue strength, the application of the Al coating makes the strength low to decline the reliability of the gas turbine blade.

However, in conventional Al coating techniques using CVD, Al is supplied through a gas fluid containing Al, and the Al-supply aims for the application of coating onto the whole of the inner surface of a cooling pass. Thus, Al coating is unfavorably applied also to a region, inside the cooling pass inner surface, turned into a temperature range where a bad effect is produced on the reliability of the blade by the Al coating.

In order to avoid such an evil based on Al coating, it is necessary to apply Al coating partially only into a portion of the inner surface of the cooling pass where an advantageous effects based on the Al coating can be expected.

In the case of Al coating onto the outer surface of a gas turbine blade, a partial application thereof can be attained by masking or some other method. However, about the inner surface of a cooling pass of the blade, which is narrow and is complicatedly configured, it is very difficult to apply a proper masking thereto highly precisely. Furthermore, the removal of the applied mask is likewise difficult. When this mask remains inside the cooling pass, the cooling pass is blocked.

Therefore, it is an urgent necessity to develop an Al coating method capable of improving a gas turbine blade in reliability by attaining, in Al coating onto the inner surface of a cooling pass of the gas turbine blade, both of an improvement in the oxidation resistance of the blade and a restraint of a decline in the fatigue strength thereof.

Japanese Unexamined Patent Application Publication No. JP 2006-169631 (Patent Document 1) discloses a technique in which in an internal pass of a turbine blade, an Al coat relatively large in thickness to be tough is formed inside the blade-shaped region of the blade while an Al coat relatively small in thickness is formed inside the root thereof.

However, the Al coat disclosed in the literature is varied in thickness in accordance with each of its portions. Accordingly, in the same manner as described above, the Al coat is formed also in a portion of the blade that does not require any Al coat. As described above, in the inner surface of the cooling pass, Al coating cannot be partially applied only into its portion where advantageous effects based on the Al coating can be expected by the technique disclosed in the literature.

Furthermore, Patent Document 1 does not naturally disclose a technique of setting an Al coating portion in accordance with the temperature distribution of the inner surface of the cooling pass. Accordingly, even when the technique disclosed in Patent Document 1 is used, it is never possible to attain both of an improvement in the oxidation resistance and a restraining of a decline in the fatigue strength.

In light of the above-mentioned problems, the present invention has been made. An object thereof is to provide a method for manufacturing a gas turbine blade which provides a gas turbine blade having a cooling pass which has an inner surface coated partially with Al, capable of improving a gas turbine blade in reliability by attaining both of an improvement in the oxidation resistance of the blade and a restraint of a decline in the fatigue strength thereof.

SUMMARY OF THE INVENTION

The present invention for attaining this object is a method for manufacturing a gas turbine blade, including the steps of: producing a gas turbine blade having a cooling pass inside thereof; and partially coating an inner surface of the cooling pass with Al.

According to the method for manufacturing a gas turbine blade of the present invention, a gas turbine blade having a cooling pass which has an inner surface coated partially with Al can be provided, and a gas turbine blade can attain both of oxidation resistance and a restraint of a decline in fatigue resistance, so that the gas turbine blade can be improved in reliability.

DETAILED DESCRIPTION OF THE PREFERRED EMBODIMENTS

Hereinafter, with reference to the drawings, embodiments of the method for manufacturing a gas turbine blade of the present invention will be described. These embodiments, which are illustrated in the drawings, are related to the method for manufacturing a gas turbine blade which has a cooling pass coated partially with Al (Aluminium) at the inner surface thereof. However, the Al coating method of the invention is, of course, applicable to an internal pass of any high-temperature component on which Al coating is not easily applied. Further, the word "blade" in the specification includes the meaning of a nozzle as well as that of a blade.

Figure 1:
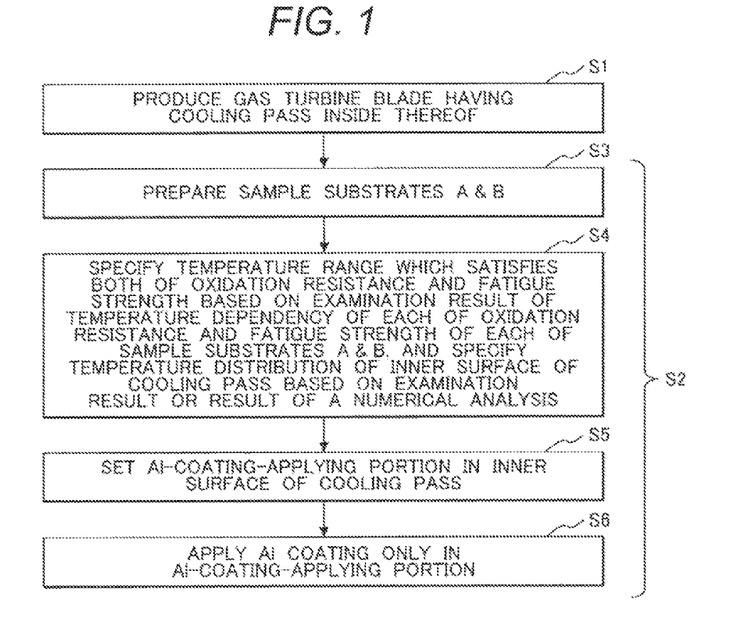
FIG. 1 is a flowchart showing the method for manufacturing a gas turbine blade of the present invention.

Method for Manufacturing a Gas Turbine Blade:

FIG. 1 is a flowchart showing the method for manufacturing a gas turbine blade of the present invention.

As shown in FIG. 1, in the method for manufacturing a gas turbine blade of the invention includes following steps:

(1) producing a gas turbine blade step which produces a gas turbine blade having a cooling pass inside thereof (S1); and (2) partially coating step which coats an inner surface of the cooling pass with Al (S2).

Further, the above coating step (S2) includes following steps:

(3) sample-substrates-preparing step which prepares a sample substrate A which comprises same composition of an actual machine of the gas turbine blade and preparing a sample substrate B which is applied an Al coating to the sample substrate A (S3);

(4) first step (S4), the following are specified: a temperature range which satisfies both of oxidation resistance and fatigue strength based on an examination result of a temperature dependency of each of the oxidation resistance and fatigue strength of each of the sample substrates A and B; and a temperature distribution of the inner surface of the cooling pass based on an examination result or result of a numerical analysis;

(5) second step (S5), which sets an Al-coating-applying portion of the inner surface of the cooling pass as the temperature range specified at the first step; and (6) third step (S6), which applies Al coating only into the set Al-coating-applying portion.

The first step involves the attainment of the two specifications, one of which is to specify the temperature range which satisfies both of oxidation resistance and fatigue strength based on an examination result of a temperature dependency of each of the oxidation resistance and fatigue strength of each of the sample substrates A and B, and the other of which is to specify the temperature distribution of the inner surface of the cooling pass. The order of these specifications is not particularly limited. These may be simultaneously performed.

The temperature environment of any gas turbine blade is varied in accordance with each of its portions, such as its portion which combustion gas collides directly with, so that the portion easily turns into a relatively high temperature, and its portion which does not directly contact with the combustion gas not to be easily raised in temperature. The environment temperature of the inner surface of a cooling pass located inside the gas turbine blade is also varied on the basis of a temperature environment variation in the outer surface of the gas turbine blade.

When Al coating is applied for causing a gas turbine blade to satisfy both of oxidation resistance and fatigue strength, the blade tends to be improved in oxidation resistance by the Al coating and be, on the contrary, lowered in fatigue strength. Accordingly, the first step includes the specification of a temperature range in which both the improvement in the oxidation and a restraint of a decline in the fatigue strength can be satisfied.

Furthermore, about the cooling pass inner surface of the gas turbine blade which is a coating target, the temperature distribution is specified to match this temperature distribution with the temperature range in which both the improvement in the oxidation resistance and the restraint of the fatigue strength decline can be satisfied, thereby preparing the setting of an optimal Al-coating-applying region. This step is the first step (S4).

Next, in a second step (S5), the Al-coating-applying portion, in the inner surface of the cooling pass, is set as the temperature range on the basis of the respective temperature dependencies of the oxidation resistance and the fatigue strength of each of the sample substrates A and B.

When the Al-coating-applying portion has been set, Al coating is next applied only into the set Al-coating-applying portion in a third step (S6).

As described above, according to the method for manufacturing a gas turbine blade of the present invention, Al coating is applied only into desired portions of the inner surface of the cooling pass of the gas turbine blade. Thus, the method can cause the gas turbine blade to satisfy both of an improvement in endurance (improvement in oxidation resistance) and a sure gain of strength reliability (restraint of a decline in fatigue strength).

The following will describe each of the individual steps in more detail.

About Producing a Gas Turbine Blade Step:

Ni-based alloy suitable for the gas turbine blade is prepared and precisely casted and then the resultant is subjected to machine work to yield a gas turbine blade having at the inside thereof a cooling pass. A preferable composition of Ni-based alloy, for example, is Ni-13.8Cr-6.8Co-1.8Mo-4.0W-4.0Al-2.8Ta-1.2Nb-3.4Ti-0.015B-0.14C (mass %).

About Sample-Substrate-Preparing Step:

a substrate which comprises same composition of an actual machine of the gas turbine blade is prepared (sample substrate A), and a substrate which is applied an Al coating to the sample substrate A is prepared (sample substrate B).

About First Step:

<Temperature Distribution Specifying Manner>

In the first step, in order to apply Al coating for gaining surely the endurance and the strength reliability of a gas turbine blade onto the inner surface of a cooling pass of the blade, the temperature distribution of the inner surface of the cooling pass is beforehand specified.

The manner for specifying the temperature distribution may be various, and examples thereof include a specifying manner using a numerical analysis (simulation) or any other analyzing process, a specifying manner using a presumption from a damage of the inner surface of the cooling pass of an actually used gas turbine blade, and a specifying manner using a presumption from a change in an alloy microstructure used as a substrate of the gas turbine blade.

In order to specify the Al-coating-applying portion of the target gas turbine blade, it is very important to grasp the temperature distribution in the cooling pass inner surface of the blade. In accordance with the size of the gas turbine blade, the shape of the inner surface of the cooling pass, and others, an appropriate manner is selected from, for example, above-mentioned specifying manners, or two or more selected therefrom are combined with each other. The selected manner or the combination is used to specify the temperature distribution in the inner surface of the cooling pass of the gas turbine blade.

<Manners for Specifying Temperature Dependencies of Oxidation Resistance and Fatigue Strength>

In order to understand the advantageous effect of Al coating on the oxidation resistance of the gas turbine blade and the bad effect thereof on the fatigue strength, the temperature dependencies of the oxidation resistance and the fatigue strength are evaluated and specified.

In order to evaluate the temperature dependencies, the above substrates A and B are used.

In a manner for evaluating the temperature dependency of the oxidation resistance of each of the substrates, for example, an isothermal exposure test, or an exposure test under heating/cooling-cycle conditions is made plural times while the temperature is varied in the range of temperatures that can exist in the inner surface of the cooling pass. An observation is made about a change in the weight that is caused by the production of an oxide (scale) onto the surface of the substrate, the state of this oxide, and others. Thus, the temperature dependency of the oxidation resistance is evaluated.

In the same way, in a manner for evaluating the temperature dependency of the fatigue strength, at plural temperatures that can exist in the inner surface of the cooling pass, the fatigue strength of each of the substrates A and B is measured. While the respective fatigue strengths of the substrate A and B are compared with each other, the temperature dependencies of the fatigue strengths of these substrates are evaluated.

Figure 2:
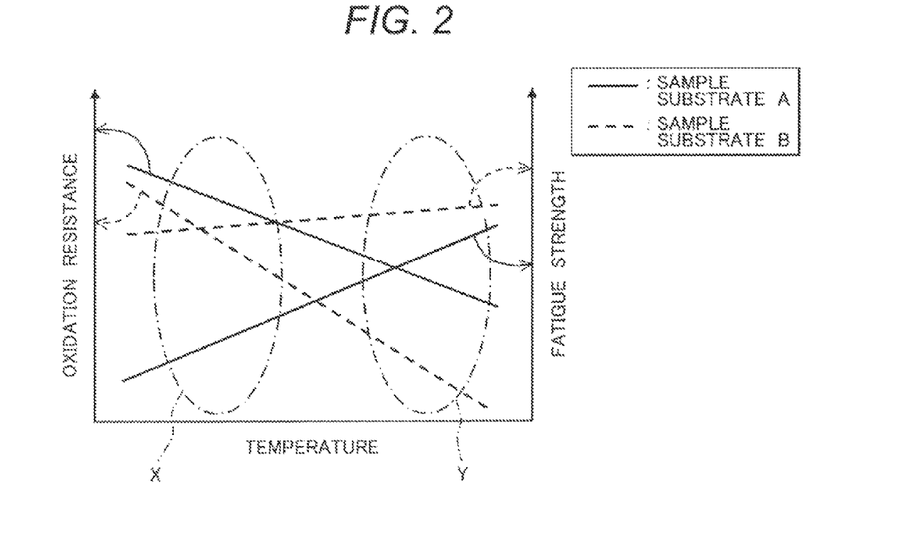
FIG. 2 is a schematic graph demonstrating the temperature dependency of each of the oxidation resistance and the fatigue strength of each of a sample substrate A to which Al coating is unapplied and a sample substrate B having a surface to which Al coating is applied; and the aforementioned first step of the present invention.

FIG. 2 is a schematic graph demonstrating the temperature dependency of each of the oxidation resistance and fatigue strength of each of the substrates A and B.

About the temperature dependency of the oxidation resistance, in the range of relatively low temperatures (for example, the range of about 500 to 600° C., or temperatures lower than the range), a large difference is not generated in oxidation resistance performance between the substrates A and B. However, with a rise in the temperature, the difference between the two increases. In the range of relatively high temperatures (for example, the range of about 800 to 1000° C., which corresponds to a region Y in FIG. 2), the difference between the two is remarkably large.

Consequently, it is understood about the temperature dependency of the oxidation resistance of the gas turbine blade that a remarkable advantageous effect is produced by the application of Al coating in the range of high temperatures. Thus, it is determined that the region Y in FIG. 2 is a temperature range in which Al coating is to be applied.

On the other hand, about the temperature dependency of the fatigue strength, in the range of relatively low temperatures (for example, the range of about 500 to 600° C., or temperatures lower than the range, which corresponds to the region X in FIG. 2), a large difference is generated in fatigue strength between the substrates A and B. With a rise in the temperature, the difference between the two decreases. In the range of relatively high temperatures, the difference between the two is very small.

Consequently, it is understood about the temperature dependency of the fatigue strength of the gas turbine blade that a remarkable advantageous effect is produced by no application of Al coating in the range of low temperatures. Thus, it is determined that the region X in FIG. 2 is a temperature range in which Al coating is not to be applied.

The inventors have made experiments for inspecting the temperature dependency of each of the oxidation resistances and fatigue strengths shown in FIG. 2.

Figure 3:
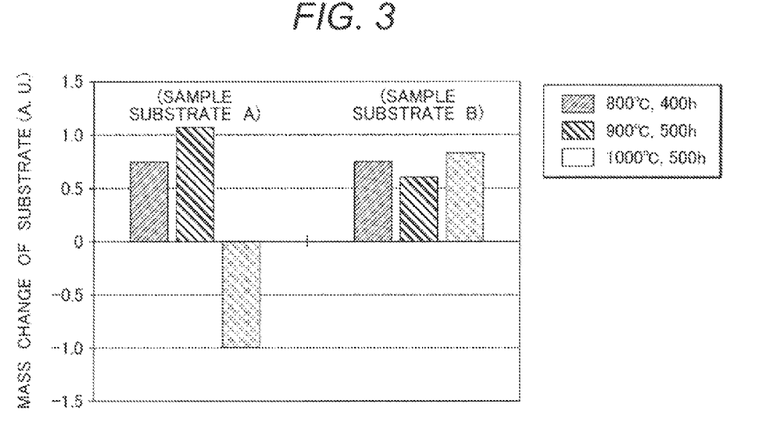
FIG. 3 is a graph showing results of an experiment in which the respective oxidation resistances of the sample substrates A and B were inspected.
Figure 4:
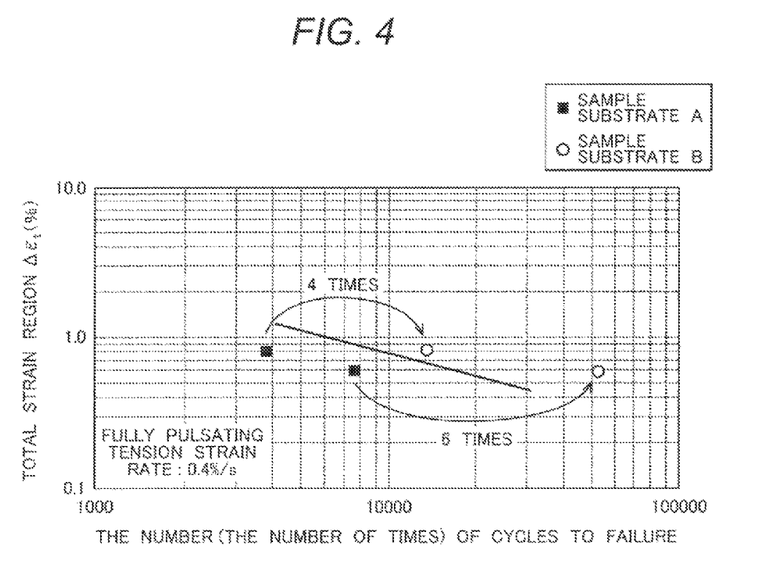
FIG. 4 is a graph showing results of an experiment in which the respective fatigue strengths of the sample substrates A and B were inspected.

FIGS. 3 and 4 are, respectively, a graph showing inspecting-experiment-results of the oxidation resistances of the substrates A and B; and a graph showing ones of the fatigue strengths of the same.

In the experiment about the oxidation resistances of the substrates A and B, a change in the mass of each of the following substrates has been gained: the substrates A and B that have exposed to 800° C.-atmosphere for 4000 hours; those to 900° C.-atmosphere for 500 hours; and those to 1000° C.-atmosphere for 500 hours. The mass change has been based on an oxide (scale) produced on the surface of each of the substrates. In FIG. 3, any minus value represents the peeling quantity when the produced scale has peeled.

It is understood from FIG. 3 that at 800° C., the substrates A and B are equivalent to each other in mass change to be equivalent to each other in oxidation resistance.

It is understood that at 900° C., the substrate B is about 30% lower than the substrate A in mass change to be largely improved in oxidation resistance.

At 1000° C., about the substrate A, enlarged oxide particles spall to show a risk that the oxide particles block the narrow cooling pass.

It is understood from these experimental results that the temperature range for Al coating is preferably a temperature range higher than 800° C., more preferably, a temperature range of about 900° C. or higher, and corresponds to the region Y in FIG. 2.

On the other hand, in the experiment about the fatigue strengths of the substrates A and B, a temperature of 500° C. has been used as a point within a low temperature range in which the difference in fatigue strength therebetween has been remarkably large, and a fatigue test according to a fully pulsating tension fatigue test has been made at a strain rate of 0.4%/sec.

FIG. 4 is concerned with the number of cycles to failure of each of two species of each of the substrates A and B, these substrates A and B being caused to correspond to each other about each of these species. About test specimens of one of the two species, the number of cycles to failure of the substrate A is 4 times that of the substrate B. About test specimens of the other, the former is 6 times the latter.

It is understood from this experiment that in a low temperature range corresponding to the region X in FIG. 2, the fatigue strength of the substrate B is about 1/6 to 1/4 of that of the substrate A, and thus this range is a range in which Al coating is not to be applied.

About Second Step:

On the basis of the item "Manners for Temperature Dependencies of Oxidation Resistance and Fatigue Strength" in the first step, the regions X and Y (temperature range) shown in FIG. 2 are specified, and then a portion corresponding to the region Y is specified for the temperature distribution specified according to the item "Manner for Specifying Temperature Distribution" in the first step. In this way, an Al-coating-applying portion of the gas turbine blade is set.

Figure 5:
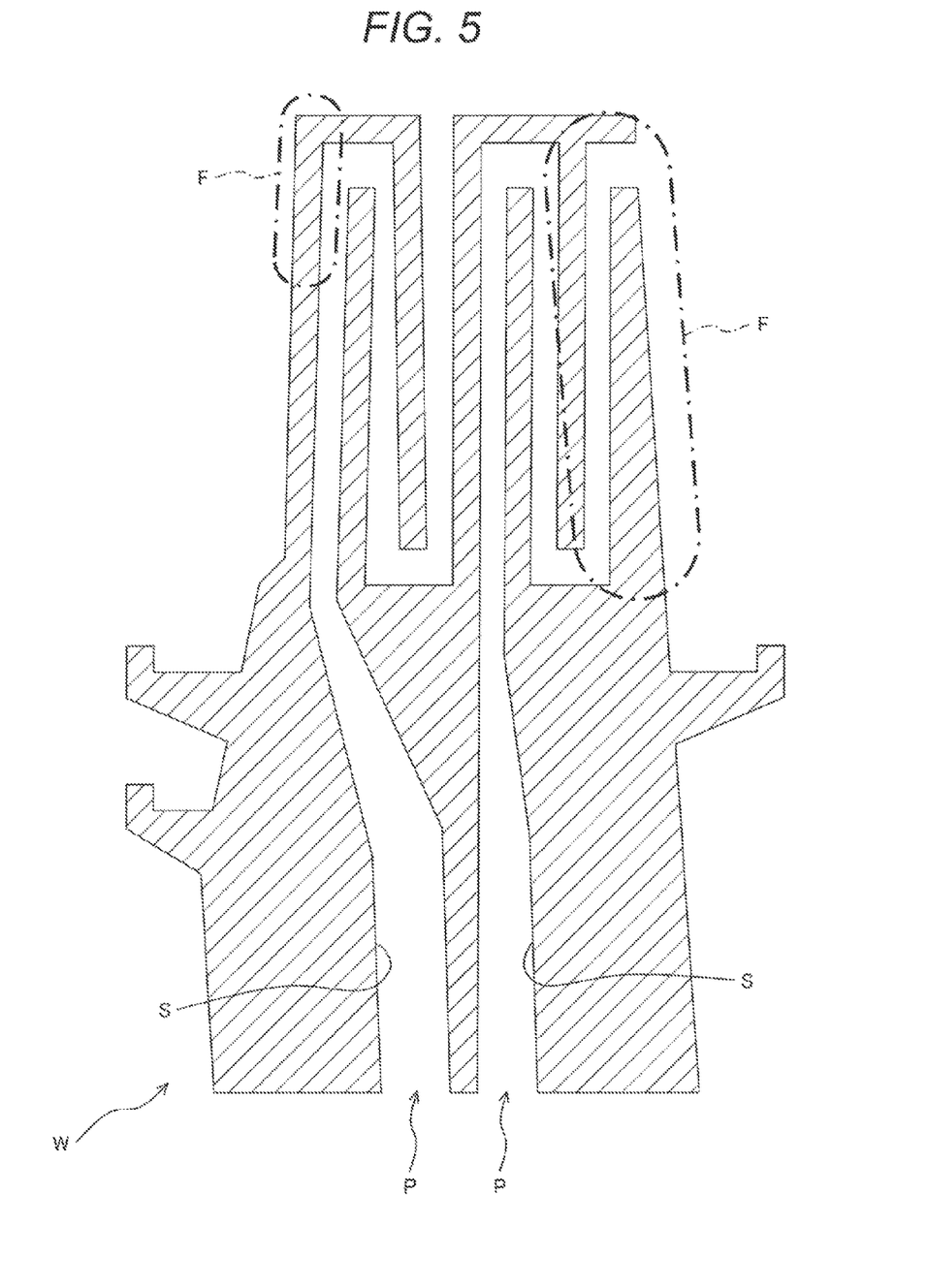
FIG. 5 is a view demonstrating the second step of the present invention.

As illustrated in FIG. 5, for example, a portion F (corresponding to the temperature range Y in FIG. 2) is specified as the Al-coating-applying portion. The portion F is a portion which can turn into a relatively high temperature and which is a portion of an inner surface S of a cooling pass P of the gas turbine blade W.

About Third Step:

Al coating is applied on the basis of the Al-coating-applying portion set in the second step.

The manner for applying the Al coating may be selected from various manners. Among the various manners, the so-called Al pack method is used, which makes use of Al pack powder composed of Al powder or Al alloy powder, as an Al supply source, and powder of a halide such as ammonium chloride or sodium chloride, as an activator for producing a gaseous halogen compound containing Al. According to this method, hydrogen chloride gas (HCl) generated by sublimating ammonium chloride ($NH_4Cl$) by heat treatment reacts with Al of the Al pack powder, and AlCl or $AlCl_3$ gas is generated and transports Al of the Al pack powder in the inner surface of the cooling pass. Al is deposited and forms a Al coating on the inner surface of the cooling pass, and forms a $Al_2O_3$ coating on the Al coating in a high temperature oxidizing atmosphere (which is an operation temperature and atmosphere of turbine blade). In addition, the Al pack powder can be prepared by mixing commercial powder of Al or Al alloy powder and powder of a halide.

Preferable conditions of the above heat treatment is at 700 to 1000° C. for 3-24 hours in an inert atmosphere or in a vacuum. The preferable range of a thickness of the Al coating is 50-150 µm. If the thickness is less than 50 µm, the coating of the inner surface of the cooling pass is not enough. In view of a process cost, it is preferable that the thickness of the Al coating is 150 µm or less. The heat treatment time range is determined by desired thickness of the Al coating. The heat treatment is carried out in an inert atmosphere or in a vacuum so as to prevent a oxidation of Al of the Al pack powder.

A structure of the Al coating produced by the Al pack method described above differs from a structure of a coating obtained by a thermal spraying, EB-PVD or CVD. The surface of the Al coating of the present invention has an asperity structure, and the powder of Al pack slightly remains. There is a possibility that these characters can be observed by a cross-sectional observation of electron microscope. This is a coating feature obtained by the Al pack method which is not observed of the coating obtained by other methods.

In the use of the Al pack method, Al pack powder is filled into the Al-coating-applying portion while inactive and adsorbable powder made of, for example, $Al_2O_3$, MgO or CaO is filled into the Al-coating-unapplying portion.

Since the inactive and adsorbable powder has, in the surface thereof, many pores to be excellent in gas absorptivity, the powder produces an advantageous effect of adsorbing Al-containing gas generated from the Al pack powder filled into the Al-coating-applying portion, so as to prevent the precipitation of Al or the formation of an Al coat layer in the Al-coating-unapplying portion of the inner surface of the cooling pass.

In particular, MgO and CaO are basic oxides to be especially good in adsorptivity of an acidic gas generated from the Al pack powder, such as HCl. Thus, the oxides are particularly preferred as the powder to be filled into the Al-coating-unapplying portion.

The heating temperature in the Al pack method is at highest about 1000° C. $Al_2O_3$, MgO and CaO are not sintered at such a temperature. Thus, the oxides are easily removed from the cooling path after the Al pack method, not to cause a problem caused by other masking methods, i.e., a problem that the cooling pass is blocked caused by a matter that the masking component remains inside the cooling pass.

By controlling the filling of each of the $Al_2O_3$, MgO and CaO powders through the weight or the volume of the powder, or a combination of the two, the Al-coating-applying portion can be selected with a good precision. Moreover, basically, the filling of the powder can be performed in the same way as used for that of the Al pack powder. Thus, a step peculiar to the filling of the powder is unnecessary. Furthermore, at the time of the powder filling, no especial apparatus or tool is necessary so that the powder filling into the cooling pass can easily be attained.

Figure 6:
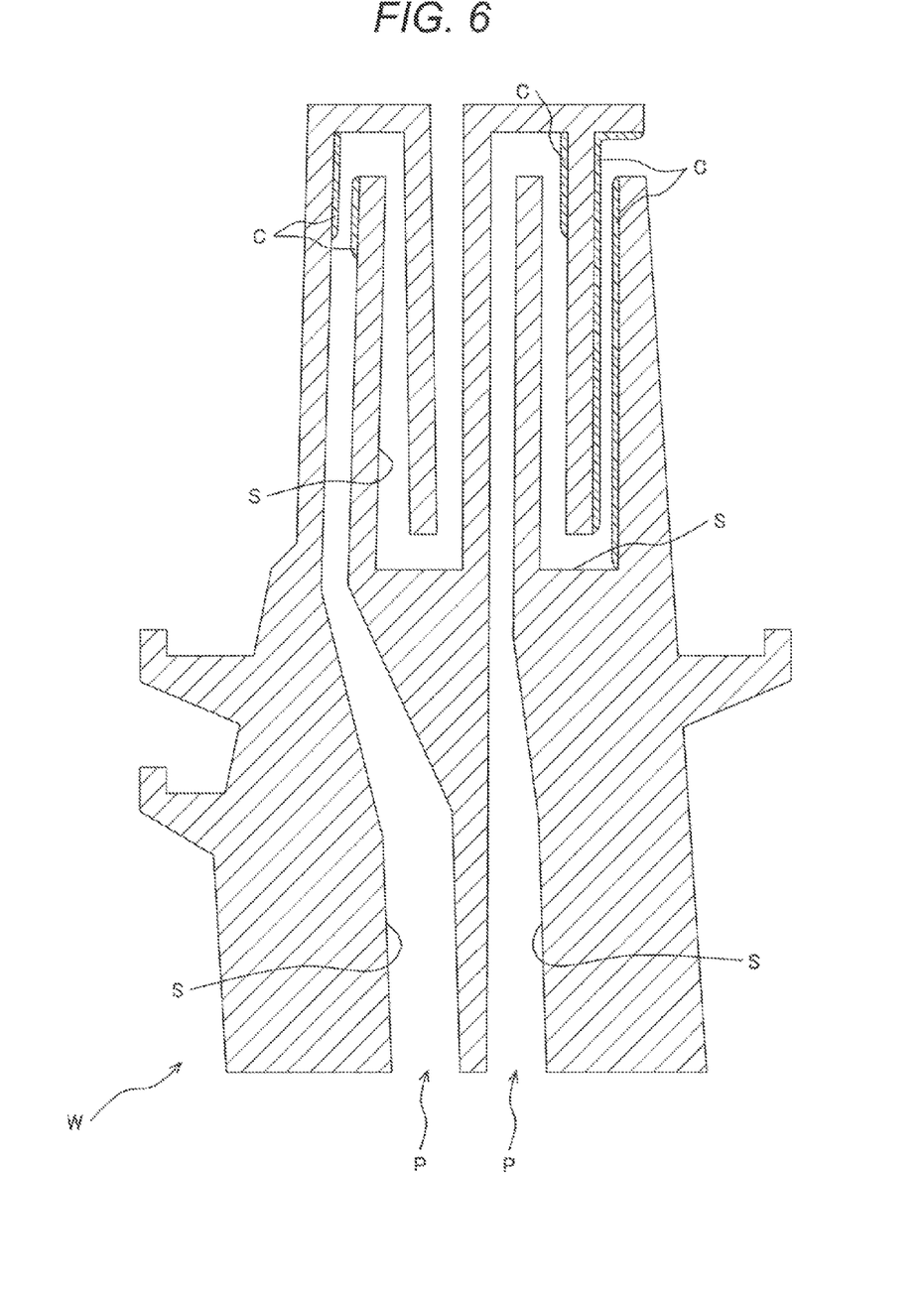
FIG. 6 is a view demonstrating the third step of the present invention.

Through the above-mentioned method, as illustrated in FIG. 6, a coat C based on the Al coating has been applied only into desired portions of the inner surface S of the cooling pass P.

EXAMPLES

The following will demonstrate specific examples of the Al coating method of the present invention.

An Ni-based alloy (Ni-13.8Cr-6.8Co-1.8Mo-4.0W-4.0Al-2.8Ta-1.2Nb-3.4Ti-0.015B-0.14C (mass %)) suitable for gas turbine members was precisely casted and then the resultant was subjected to machine work to yield a gas turbine blade having at the inside thereof a cooling pass.

About this gas turbine blade, on the basis of the shape of the internal cooling pass, the volume of cooling air, and others, a temperature distribution in the inner surface of the cooling pass was gained by a numerical analysis. The present example gave a result that the respective temperatures of the leading edge and the trailing edge of the blade tip reached to a high temperature of 900° C. and the temperatures of most portions of the blade were 800° C. or lower.

In order to examine the temperature dependencies of the oxidation resistance and the fatigue strength of the blade, a high temperature exposure test and a fatigue test were made in the atmosphere about an untreated substrate (of the blade) to which no Al coating was applied and a treated substrate to which Al coating was applied. The contents of these tests have been already demonstrated with reference to FIGS. 3 and 4. However, another description will be made hereinafter.

The oxidation resistances of the substrates were each evaluated, according to the exposure test in the atmosphere, through a weight change following oxidation. The test temperature was varied in the range of temperatures of the cooling pass inner surface. Some samples of the substrates were subjected to the test at longest over 4000 hours. As a result, over the range of the entire test periods at 900° C. or higher, about the treated substrate, the weight change based on oxidation was smaller by the Al coating than about the untreated substrate. Thus, the advantageous effect of improving the oxidation resistance by the Al coating was obtained.

At 800° C., up to 500 hours at the initial stage of the exposure, a reversal tendency was observed that the weight change of the untreated substrate was smaller than that of the Al coated substrate. After 4000 hours, however, the changes of the two were equivalent to each other.

By contrast, at 700° C. or lower, the weight change of the Al coated substrate was larger than that of the untreated substrate. Thus, it was judged that the advantageous effect of the Al coating was small for the oxidation resistance.

The fatigue test was made in a temperature range equivalent to that in the oxidation resistance test.

At 800° C., the Al coating made the fatigue strength low; however, the number of cycles to failure of the Al coated substrate was about 75% of that of the untreated substrate. However, at temperatures lower than 800° C., the Al coated substrate was abruptly lowered in fatigue strength. At 600° C., the fatigue strength was lowered to 25% of that of the untreated substrate.

After the fatigue test, cross sections of the substrates were observed. As a result, in the case of the test period of 600° C., many cracks were generated in their coating layers to reach the substrates.

From these results, it was judged that at 800° C. or lower, the fatigue strength was remarkably lowered by the Al coating.

In light of these data, the temperature range for Al coating application was set into the range of about 800 to 900° C., or to a higher temperature. When this range was compared with the previously gained temperature distribution, an Al-coating-applying portion was decided.

Next, Al pack powder was filled into the Al-coating-applying portion while $Al_2O_3$ powder into the Al-coating-unapplying portion.

In order to attain the partially-filling operations, the operations were controlled through the respective weights of the powders. Before setting the weights, the respective bulk densities of the Al pack powder and the $Al_2O_3$, were measured. In the present example, the density of the Al pack powder was about 1.45 g/cm³, and that of the $Al_2O_3$ was 1.15 g/cm³. Next, the volume of the cooling pass in the Al-coating-applying portion, and that in the Al-coating-unapplying portion were gained. From the volumes and the powder densities, the respective weights of the Al pack powder and the $Al_2O_3$ powder were calculated out.

The Al pack powder was filled into sites at the leading edge side and the trailing edge side of the tip of the blade.

About a process for filling the powders, it is necessary to make a consideration in accordance with the structure of the cooling pass. In the present example, in the filling at the leading edge side of the blade tip, a predetermined quantity weighed out from the $Al_2O_3$ powder was filled into a portion of the leading edge through an opening in the blade tip by turning the blade upside down and vibrating a vibrating stand for the blade. Thereafter, the opening in the blade tip was temporarily sealed with a tape and others; the Al pack powder was filled thereinto through an opening in the root of the blade; and then the blade was vibrated. Thereafter, the $Al_2O_3$ powder was again filled thereinto from the root, and then the opening at the root side was temporarily sealed with a tape. Thus, the filling was finished.

In the filling at the trailing edge side, a predetermined quantity of the $Al_2O_3$ powder was filled into a portion of the trailing edge from the root, and then an opening in the root was temporarily sealed with a tape. Next, from the trailing edge side, the Al pack powder and the $Al_2O_3$ powder were filled thereinto in this order. The Al pack powder was again filled into the trailing edge portion so that the powder was adjusted into desired filling sites.

After the finish of the fillings of the powders, the temporarily sealing tapes were taken away, and the gas turbine blade was set in a heating furnace to be heated in argon gas at 750° C. for 3 hours.

The blade was cooled, and then the Al powder and the $Al_2O_3$ powder were removed by causing compressed air to flow into the cooling pass. The $Al_2O_3$ powder was easily removed without being sintered. In addition, the Al powder and the $Al_2O_3$ powder can also be removed by flowing water.

The blade was cut and examined to check the positional precision of the Al-coating-applying portion and the Al-coating-unapplying portion, and the microstructure of a boundary between the portions.

As a result, the error between the beforehand-set Al-coating-applying portion and an actual Al-coating-applying portion was 10 mm or less on average. Thus, the selection of the Al-coating-applying portion was attainable with a high precision.

Figure 7:
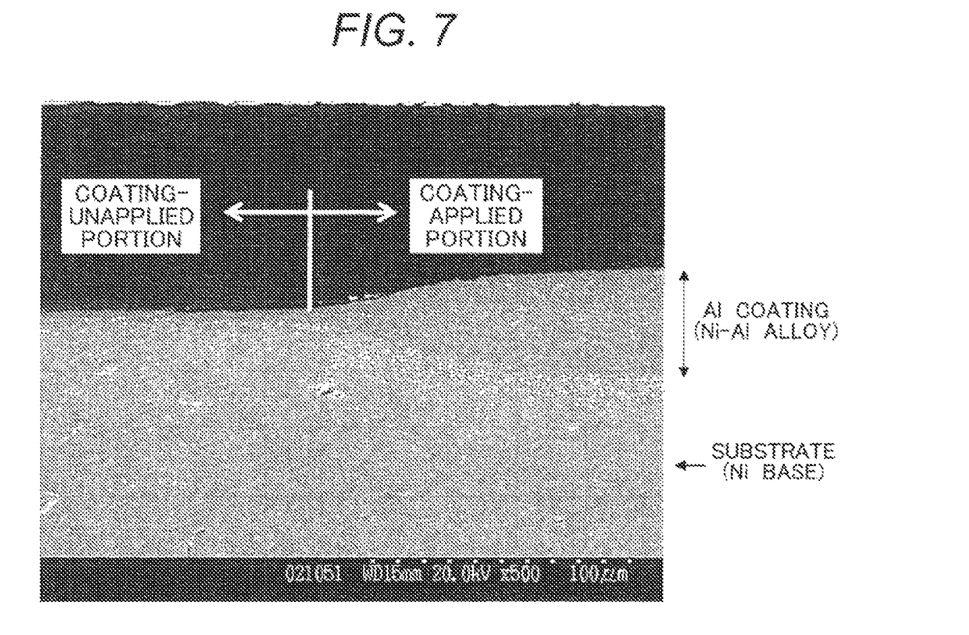
FIG. 7 is an SEM photograph showing a situation that Al coating was applied to a desired portion of the cooling pass inner surface of a gas turbine blade.

FIG. 7 is a sectional SEM photograph of the boundary between the Al-coating-applying portion and the Al-coating-unapplying portion. From FIG. 7, it is understood that no Al coat layer was formed in the Al-coating-unapplying portion and Al-containing gas was adsorbed onto the $Al_2O_3$ powder to succeed in the prevention of Al precipitation and the formation of any Al coat layer onto the inner surface of the cooling pass.

At the boundary between the Al-coating-applying portion and the Al-coating-unapplying portion, peeling and others were not caused so that the boundary changed continuously and smoothly.

If the boundary is present to have an acute angle, there is a risk that the angular corner functions as a point at which a fatigue crack is generated. Thus, the shape of the boundary in the present example is preferred for the fatigue strength of the blade.

As to whether or not the presence of such a boundary affects the fatigue strength, an examination was made by making a fatigue test using a test specimen into which a boundary was introduced. As a result, the number of cycles to failure of this test specimen was not largely different from that of a test specimen the entire surfaces of which were coated with Al. Thus, it has been made evident that the presence of such a boundary does not produce a large effect on the fatigue strength.

As described above, the method for manufacturing a turbine blade of the present invention makes it possible to improve the oxidation resistance of the inner surface of the cooling pass of a gas turbine blade; set, with a high precision, an Al-coating-applying portion producing no bad effect on the fatigue strength of the blade; and apply an Al coat layer selectively to ensure the endurance and the strength reliability of the gas turbine blade.

REFERENCE SIGNS LIST

W:gas turbine blade, P:cooling pass, S:inner surface, C:Al coat F:Al-coating-applying portion

What is claimed is:

1. A method for manufacturing a gas turbine blade, comprising the steps of:
    producing a gas turbine blade having a cooling pass inside thereof; and
    partially coating an inner surface of the cooling pass with Al;
    wherein the step of partially coating an inner surface of the cooling pass with Al comprising:
    a sample-substrates-preparing step of preparing a sample substrate A which comprises same composition of an actual machine of the gas turbine blade and preparing a sample substrate B which is applied an Al coating to the sample substrate A;
    a first step of specifying a temperature range which satisfies both of oxidation resistance and fatigue strength based on an examination result of a temperature dependency of each of the oxidation resistance and fatigue strength of each of the sample substrates A and B, and further specifying the temperature distribution of the inner surface of the cooling pass based on an examination result or result of a numerical analysis;
    a second step of setting an Al-coating-applying portion of the inner surface of the cooling pass as the temperature range specified at the first step; and
    a third step of applying Al coating only into the set Al-coating-applying portion.

2. The method according to claim 1,
    wherein the third step further comprising the steps of:
    filling the cooling path with Al pack powder which comprises Al powder or Al alloy powder and powder of an adsorbable metal oxide;
    heating the turbine blade in argon gas at 700 to 1000° C.; and
    cooling the turbine blade and removing the adsorbable metal oxide in the cooling path.

3. The method according to claim 2,
    wherein the adsorbable metal oxide is filled into an Al-coating-unapplying portion of the inner surface of the cooling pass, which is not the Al-coating-applying portion.

4. The method according to claim 2,
    wherein the metal oxide is any one selected from the group consisting of $Al_2O_3$, MgO and CaO.

* * * * *